United States Patent
Yuki et al.

(10) Patent No.: US 8,765,093 B2
(45) Date of Patent: Jul. 1, 2014

(54) EXPANDED GRAPHITE SHEET

(75) Inventors: Tetsuya Yuki, Mitoyo (JP); Yoshiaki Hirose, Mitoyo (JP)

(73) Assignee: Toyo Tanso Co., Ltd., Osaka-shi (JP)

(*) Notice: Subject to any disclaimer, the term of this patent is extended or adjusted under 35 U.S.C. 154(b) by 46 days.

(21) Appl. No.: 13/382,185

(22) PCT Filed: Aug. 6, 2010

(86) PCT No.: PCT/JP2010/063349
§ 371 (c)(1),
(2), (4) Date: Jan. 4, 2012

(87) PCT Pub. No.: WO2011/016542
PCT Pub. Date: Feb. 10, 2011

(65) Prior Publication Data
US 2012/0107222 A1   May 3, 2012

(30) Foreign Application Priority Data

Aug. 7, 2009   (JP) .................................. 2009-185011

(51) Int. Cl.
*C01B 31/04* (2006.01)
(52) U.S. Cl.
USPC ....................................... 423/448
(58) Field of Classification Search
USPC ....................................... 423/448
See application file for complete search history.

(56) References Cited

U.S. PATENT DOCUMENTS

2004/0043220 A1   3/2004   Hirose et al.

FOREIGN PATENT DOCUMENTS

| CN | 1480394 A | 3/2004 |
| JP | 4-021509 A | 1/1992 |
| JP | 2620606 B2 | 6/1997 |

OTHER PUBLICATIONS

Singapore Search Report and Written Opinion dated Oct. 31, 2012, issued in corresponding Singapore patent application No. 201200454-5.
International Search Report of PCT/JP2010/063349, mailing date Sep. 28, 2010.
Japanese Office Action dated Aug. 21, 2013, in corresponding Japanese Application No. 2009-185011. with English translation. (9 pages).
Chinese Office Action dated Jul. 25, 2013, in corresponding Chinese Application No. 201080030449.2 w/English Translation. (10 pages).

*Primary Examiner* — Daniel C McCracken
(74) *Attorney, Agent, or Firm* — Westerman, Hattori, Daniels & Adrian, LLP

(57) ABSTRACT

An object is to provide an expanded graphite sheet at the use stage that can prevent can prevent degradation in product quality and deterioration in product yield by inhibiting the expanded graphite sheet from containing impurities even when the expanded graphite sheet is actually used.

An expanded graphite sheet at the use stage in a condition in which the expanded graphite sheet is packed with a packing material and thereafter removed from the packing material, characterized in that all of the amounts of Al, B, Be, Ca, Cu, Fe, Li, Mg, Ni, S, Ti, V, and Zn as determined by an ICP emission spectroscopy method, the amounts of K and Na as determined by an atomic absorption spectrometry method, and the amount of Si as determined by an absorption spectrophotometry method are at a level less than the detection limit.

1 Claim, 2 Drawing Sheets

EXPANDED GRAPHITE SHEET

TECHNICAL FIELD

The present invention relates to an expanded graphite sheet, and more particularly to an expanded graphite sheet with extremely low total impurities at use stage.

BACKGROUND ART

The flexible expanded graphite sheet itself has been traditionally well known. This graphite sheet is usually manufactured in the following manner. Natural flake graphite, kish graphite, or the like is subjected to an oxidation treatment by anodic oxidation or immersion in an acid (for example, a mixed acid in which nitric acid or the like is added to a concentrated sulfuric acid), and the resultant material is washed with water and then dried, followed by a heating and expanding process to produce expanded graphite. The expanded graphite is compression-molded by a press machine or a rolling machine. This expanded graphite sheet shows not only excellent chemical resistance, heat resistance, heat and electrical conductivity, which are the features of graphite, but also high flexibility and compression recovery, and moreover has large anisotropy. Therefore, the expanded graphite sheet is widely used for various packing materials, high-temperature heat insulating materials, and heat radiating materials.

However, the just-described expanded graphite sheet contains impurities such as Si as well as Fe and Al in large amounts because the starting material thereof is natural flake graphite or kish graphite. Moreover, because it is produced through the immersion treatment in the concentrated-sulfuric-acid-based mixed acid, it has a significant drawback that sulfur compounds remain therein in large amounts and the content of S is particularly large. For this reason, there is a drawback that, when this expanded graphite sheet is used under such conditions as a heated condition, reduced pressure, or gas substitution, the atmosphere is contaminated because of these impurities. This drawback tends to be particularly evident especially when the content of S as an impurity is high.

In view of the foregoing, the present inventors have proposed a flexible, high-purity expanded graphite sheet in which the content of S is 15 ppm or less and the total impurity content other than S is 20 ppm or less.

CITATION LIST

Patent Documents

[Patent Document 1]
Japanese Published Unexamined Patent Application No. H04-021509 A

SUMMARY OF THE INVENTION

Problems to be Solved by the Invention

The above-described conventional method can provide an expanded graphite sheet having an extremely low impurity content. Nevertheless, when the expanded graphite sheet is actually used (for example, used as one member in a manufacturing apparatus that requires purity, such as in a silicon single crystal manufacturing apparatus), there may be cases in which the expanded graphite sheet contains impurities. The reason is believed to be as follows. After having been manufactured, the expanded graphite sheet is packed and shipped, and thereafter removed from the packing material and then used. In the packing and shipping stage, it is believed that impurities are attached to the expanded graphite sheet. Such a situation causes adverse effects on the product (silicon single crystal in the example described above), resulting in the problems such as degradation in product quality and deterioration in product yield.

In view of this, it is an object of the present invention is to provide an expanded graphite sheet at the use stage that can prevent degradation in product quality and deterioration in product yield, by inhibiting the expanded graphite sheet from containing impurities at the manufacturing stage of the expanded graphite sheet and when the expanded graphite sheet is actually used.

Means for Solving the Problems

In order to accomplish the foregoing object, the present invention provides an expanded graphite sheet characterized in that all impurities are at a level less than respective detection limits.

With the above-described configuration, the expanded graphite sheet can be prevented from containing large amounts of impurities even when the expanded graphite sheet is actually used (for example, when used as one member in an apparatus for manufacturing a product that requires purity, such as in a silicon single crystal manufacturing apparatus). As a result, it is possible to inhibit degradation in product quality or deterioration in product yield that results from the adverse effects on the product (for example, silicon single crystal).

The impurities may include Al, B, Be, Ca, Cu, Fe, K, Li, Mg, Na, Ni, S, Si, Ti, V, and Zn; the amounts of the Al, the B, the Be, the Ca, the Cu, the Fe, the Li, the Mg, the Ni, the S, the Ti, the V, and the Zn may be determined by an ICP emission spectroscopy method; the amounts of the K and the Na may be determined by an atomic absorption spectrometry method; and the amount of the Si may be determined by an absorption spectrophotometry method.

The impurities may be ones at a use stage in a condition in which the expanded graphite sheet has been packed with a packing material and thereafter removed from the packing material.

In addition, the amount of the Al may be less than 0.08 mass ppm, the amount of the B may be less than 0.1 mass ppm, the amount of the Be may be less than 0.02 mass ppm, the amount of the Ca may be less than 0.04 mass ppm, the amount of the Cu may be less than 0.08 mass ppm, the amount of the Fe may be less than 0.04 mass ppm, the amount of the K may be less than 0.1 mass ppm, the amount of the Li may be less than 0.01 mass ppm, the amount of the Mg may be less than 0.02 mass ppm, the amount of the Na may be less than 0.05 mass ppm, the amount of the Ni may be less than 0.1 mass ppm, the amount of the S may be less than 1.0 mass ppm, the amount of the Si may be less than 0.1 mass ppm, the amount of the Ti may be less than 0.09 mass ppm, the amount of the V may be less than 0.07 mass ppm, and the amount of the Zn may be less than 0.1 mass ppm.

Moreover, the packing material may contain B, Ba, Ca, Cu, Li, Ni, Mn, Mo, Ti, and Pb, and when determined by an ICP-MS method, all the elements may be at a level less than respective detection limits.

In addition, the packing material contains Al, Fe, Cr, Mg, Na, V, and Zn; and when measured by an ICP-MS method, the amount of Al is equal to or less than $2 \times 10^{-7}$ mol/m$^2$; the amount of Fe is equal to or less than $3 \times 10^{-7}$ mol/m$^2$; the amount of Cr is equal to or less than $2\times10^{-7}$ mol/m$^2$; the amount of Mg is equal to or less than $2\times10^{-7}$ mol/m$^2$; the amount of Na is equal to or less than $5\times10^{-7}$ mol/m$^2$; the amount of V is equal to or less than $2\times10^{-7}$ mol/m$^2$; and the amount of Zn is equal to or less than $2\times10^{-7}$ mol/m$^2$.

Advantages of the Invention

The present invention exhibits a significant advantageous effect that it can prevent degradation in product quality and deterioration in product yield, by inhibiting an expanded graphite sheet from containing impurities at the manufacturing stage of the expanded graphite sheet and when the expanded graphite sheet is actually used.

BEST MODE FOR CARRYING OUT THE INVENTION

Figure 1:
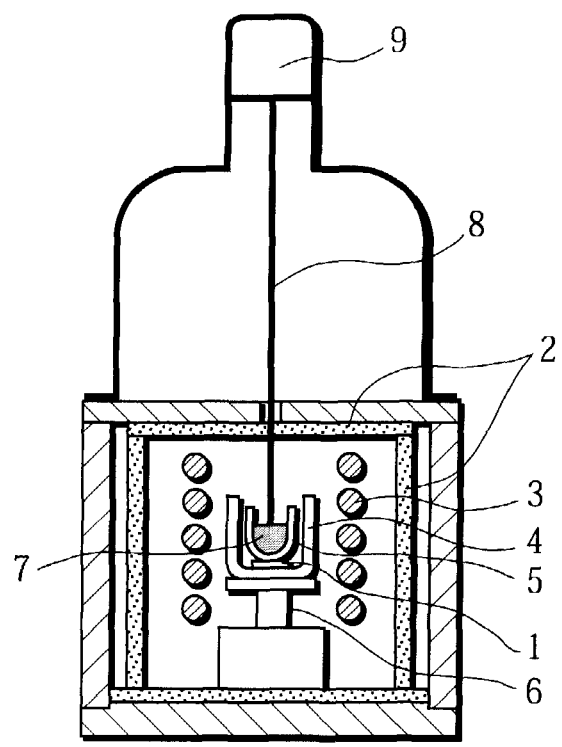
FIG. 1 is a cross-sectional view illustrating a single crystal pulling apparatus using an expanded graphite sheet according to the present invention at the use stage.

In order that, in the expanded graphite sheet at the manufacturing stage (at the stage before packed with a packing material) and at the use stage, all impurities should be at a level less than their respective detection limits, it is necessary that all the impurities are at a level less than their respective detection limits at least at the manufacturing stage of the expanded graphite sheet. For this reason, a method of manufacturing such an expanded graphite sheet will be described below.

The above-described high-purity expanded graphite sheet can be produced by heat-treating a conventional expanded graphite sheet under the following conditions. Specifically, an expanded graphite sheet (hereinafter also referred to simply as a "carbon sheet") having a bulk density of 0.7 g/cm$^3$ to 1.3 g/cm$^3$ (preferably 0.8 g/cm$^3$ to 1.0 g/cm$^3$), is retained at 800° C. to 1000° C. in a vessel usually for 1-10 hours. In this case, the temperature is set at 800° C. or higher because, if the temperature is lower than that, the vapor pressure of the halogenated impurities will not be reached and the impurities cannot be evaporated or volatilized sufficiently.

Preferably, after the just-mentioned temperature is kept at for 3 to 5 hours, the temperature is elevated gradually, and is then retained for 5 to 24 hours (preferably 7 to 15 hours) while being adjusted from 2450° C. to 2500° C. The retaining time is restricted to 5 to 24 hours because if the time is less than 5 hours, the halogenated organic substance does not permeate into the graphite sheet sufficiently, and the impurities existing in the sheet cannot be evaporated or volatilized by turning them into halides and increasing the vapor pressure. On the other hand, even if the time exceeds 24 hours, the evaporation or volatilization of the impurities will reach a steady state, and the advantageous effect obtained will be insignificant.

Moreover, the reason why the bulk density of the expanded graphite sheet is restricted to 0.7 g/cm$^3$ to 1.3 g/cm$^3$ is as follows. If it is less than 0.7 g/cm$^3$, the strength will be insufficient. On the other hand, if it is greater than 1.3 g/cm$^3$, it will take a long time for the purity enhancement, so the cost will be high.

The pressure in the vessel is kept at about 1 to 100 Torr (preferably 10 to 40 Torr) from the time point at which the heating has been started, so it is advantageous for discharging the outgas, which starts to volatilize in a small amount at this stage. The reason why the pressure in the vessel is restricted to 1 to 100 Torr is as follows. If the pressure exceeds 100 Torr, the effect obtained by reducing the pressure will be small, and it will take a long time for the purity enhancement, increasing the cost. On the other hand, if the pressure is less than 1 Torr, the amount of halogen will be small, resulting in insufficient purity, and a large pump drive power will become necessary for removing the generated gas, increasing the cost. It should be noted that the pressure in the vessel refers to the total (total pressure) of vapor pressures (partial pressures) of various chemical compounds, such as halides, chlorinated and/or fluorinated impurities, and the N$_2$ gas remaining after substitution.

At the stage at which the purity enhancement has advanced to a certain degree, a halogenated organic gas, for example, a halogen gas such as dichlorodifluoromethane is supplied through a gas supply pipe for 3 to 8 hours (at a flow rate of, for example, about 1-7 L NPT/kg, although it may be increased or decreased depending on the amount of the carbon sheet to be heated that is placed in the vessel) while keeping the reduced pressure condition.

The halogenated organic gas used for the purity enhancement is necessary in order to turn the impurities, particularly metal impurities, contained in the carbon sheet into halide salts and increase the vapor pressure so that they can be evaporated or volatilized, thereby increasing the purity of the carbon sheet, which is the base material. As the halogenated organic substance, it is possible to use any halogenated organic substance that has conventionally been used for a graphite material. For example, it is possible to use not only chlorine and chlorine compounds but also fluorine and fluorine compounds. Moreover, it is also possible to use a chlorine-based gas or a fluorine-based gas at the same time. It is also possible to use a compound that contains fluorine and chlorine in the same molecule, such as monochlorotrifluoromethane, trichloromonofluoromethane, cyclodifluoroethane, and trichloromonofluoroethane.

In addition, depending on the type of impurity, H$_2$ exhibits a high purifying effect for, for example, sulfur contents. Therefore, by successively supplying H$_2$ gas after stopping the supply of the halogenated organic substance, desulfurization can be performed more thoroughly. In this case, if the temperature is lower than 800° C., the reactivity between sulfur and hydrogen gas will be poor, which is undesirable. If the pressure is higher than 100 Torr, the effect obtained by reducing the pressure will be insufficient. On the other hand, if the pressure is lower than 1 Torr, the absolute amount of the hydrogen gas supplied will be insufficient, and the removal of sulfur by the hydrogen gas cannot be performed sufficiently. For these reasons, it is preferable that, during the purification by H$_2$, the temperature be restricted to 800° C. or higher and the pressure be from 1 to 100 Torr.

Furthermore, it is preferable that the temperature of the interior of the furnace preferably be further elevated at the time point when the purity enhancement operation has finished and then kept at 3000° C. for 10 to 30 hours, and then the process be finished.

Thereafter, the furnace is cooled. At this time, the pressure of the interior of the vessel is reduced forcibly to 10$^{-2}$ Torr to 10$^{-4}$ Torr at about 2000° C. and cooled, whereby a high-purity carbon sheet can be obtained with small amounts of outgas and S. It is believed that gases, such as the halogenated organic substance gas and the outgas, can flow in and out from the side faces of the sheet.

Thereafter, electricity is stopped, and the temperature and the pressure are returned to normal pressure and normal temperature while filling and replacing $N_2$ gas in the vessel. Subsequently, compression molding is carried out by, for example, pressure-rolling using a common compression molding means, such as a press machine or a rolling machine.

It should be noted that it is possible to use a high-frequency vacuum induction furnace in the above-described impurity removal (the purity enhancement process), which results in the advantages described in the following (1) and (2).

(1) An advantage is that, when the carbon sheet to be heated is brought into contact with the halogenated organic substance under a vacuum or reduced pressure condition, the amount of the halogenated organic substance consumed will be very small. Under a vacuum or reduced pressure condition, the halogenated organic gas used expands. As a result, the utilization efficiency is high, and in addition, it makes good contact with the carbon sheet. According to the result of the test conducted by the present inventors, the amount of the dichlorodifluoromethane consumed is (3 L NPT/kg) for the high-frequency type in comparison with (10 L NPT/kg) for the case of the electric hearth furnace. Thus, the amount of the dichlorodifluoromethane consumed can be reduced to ⅓ in the case of the high-frequency type, in comparison with the electric hearth furnace.

(2) The impurities in the carbon sheet that have been halogenated and/or hydrogenated can be easily vaporized and released outside because the atmosphere is in a reduced pressure condition. Therefore, a graphite material with a higher purity can be obtained even with the use of halogenated organic gas in a small amount.

The expanded graphite sheet fabricated in the above-described manner is packed with a packing material, thereafter shipped, and further removed from the packing material, to use it for an actual apparatus. All the impurities at the use stage are at a level less than their respective detection limits. At this time, it is important that, of the impurities, Al, B, Be, Ca, Cu, Fe, K, Li, Mg, Na, Ni, S, Si, Ti, V, and Zn are at a level less than their respective detection limits.

With the above-described configuration, the expanded graphite sheet is prevented from containing large amounts of impurities even when the expanded graphite sheet is actually used. As a result, it is possible to inhibit degradation in product quality and deterioration in product yield, which result from the adverse effects on the products and the like.

Next, examples of the expanded graphite sheet at the use stage are shown below.

(1) An example of using the expanded graphite sheet as a spacer and a heat insulating material for a single crystal pulling apparatus FIG. 1 is a cross-sectional view of the single crystal pulling apparatus. In FIG. 1, reference numeral 1 denotes a spacer made of the expanded graphite sheet of the present invention, and likewise, reference numeral 2 denotes a heat insulating material made of the expanded graphite sheet of the present invention. In FIG. 1, reference numeral 3 denotes a graphite heater, reference numeral 4 denotes a graphite crucible, reference numeral 5 denotes a quartz crucible, reference numeral 6 denotes a graphite pedestal, reference numeral 7 denotes silicon, reference numeral 8 denotes a single crystal, and reference numeral 9 denotes a pulling apparatus therefor. The quartz crucible 5 is placed directly on the spacer 1, and molten silicon 7 exists in this quartz crucible 5. This means that, if impurities are precipitated out of the spacer, the quality of the silicon single crystal 8 will be adversely affected immediately, and also the quartz crucible 5 will be contaminated and damaged. However, the high-purity sheet such as that of the present invention does not cause such a trouble. In addition, because the heat insulating material 2 is also placed on the inner surface of the single crystal puller apparatus, the impurities from the heat insulating material 2 may contaminate the atmosphere within the apparatus and adversely affect the silicon single crystal 8, and moreover, there is a risk of contamination and corrosion of the interior of the apparatus. However, since the sheet of the present invention has a high purity, almost no such trouble can occur.

Figure 2:
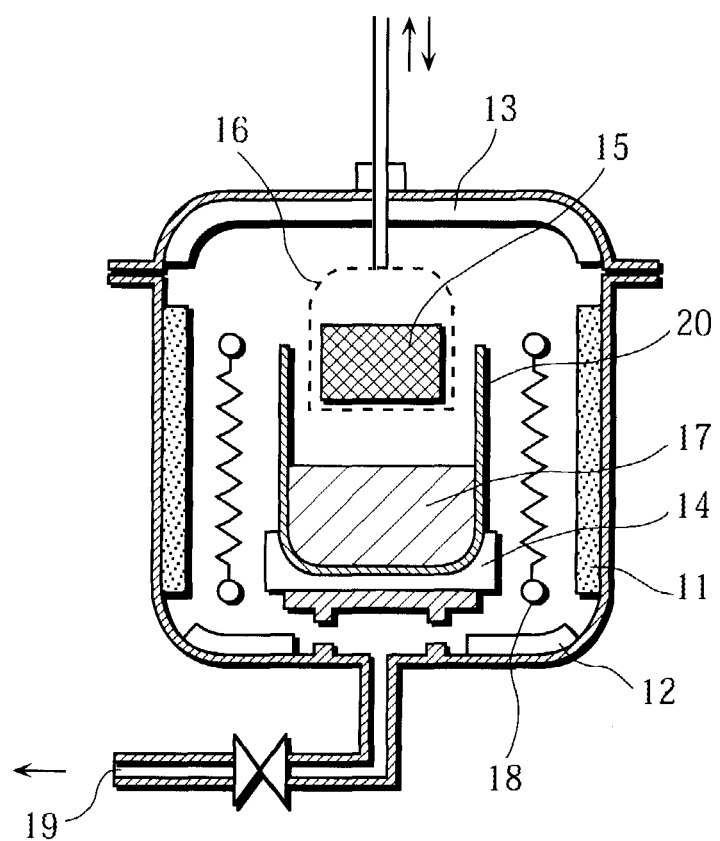
FIG. 2 is a cross-sectional view illustrating a high-pressure impregnating apparatus using the expanded graphite sheet according to the present invention at the use stage.

(2) An example of using the expanded graphite sheet as a heat insulating material and a spacer for a high-pressure impregnating apparatus FIG. 2 is a cross-sectional view of a high-pressure metal impregnation apparatus (particularly, a metal impregnation apparatus for carbon materials). It shows an example in which the present invention sheet is used for heat insulating materials 11 to 13 and for a spacer 14, which is a cushioning material. In FIG. 2, reference numeral 15 denotes a carbon material to be impregnated with a metal, reference numeral 16 denotes a porous basket, reference numeral 17 denotes molten metal, reference numeral 18 denotes a resistance heater, reference numeral 19 denotes an exhaust pipe, and reference numeral 20 denotes a crucible. In this apparatus as well, the purity of the heat insulating materials 11 to 13 disposed on the inner surface of the apparatus has a significant effect. Because the sheet of the present invention has a high purity, it is extremely suitable.

EXAMPLES

Natural flake graphite immersed in a mixture solution in which 7 to 25 parts by weight potassium permanganate with respect to 100 parts by weight of graphite was dissolved in a concentrated sulfuric acid was heated to 800° C. to 1000° C. to obtain expanded graphite, which was expanded in volume to 140 cm$^3$/g to 160 cm$^3$/g. The expanded graphite was subjected to roll-press forming to obtain an expanded graphite sheet having a bulk density of 1.0 g/cm$^3$. The resultant expanded graphite sheet was heat-treated at 10 Torr and at 1000° C. for 10 hours in a difluoromethane gas atmosphere. Thereafter, the temperature was gradually elevated and then retained at 2450° C. to 2500° C. for 10 hours. Thereafter, while reducing the temperature to about 2000° C., the pressure of the interior of the vessel was reduced forcibly to 10$^2$ Torr, and the temperature and the pressure were returned to normal pressure and normal temperature while filling and replacing $N_2$ gas in the vessel. The thickness increase at this time was 11%, and a high-purity expanded graphite sheet having a bulk density of 0.9 g/cm$^3$ was obtained. The ash content of this sheet was determined. The results are shown in Table 1.

TABLE 1

| Element | Test method | Detection limit | Result of analysis |
|---|---|---|---|
| Al | ICP emission spectroscopy | 0.08 mass ppm | Less than detection limit |
| B | | 0.1 mass ppm | |
| Be | | 0.02 mass ppm | |
| Ca | | 0.04 mass ppm | |
| Cu | | 0.08 mass ppm | |
| Fe | | 0.04 mass ppm | |
| K | Atomic absorption spectrometry | 0.1 mass ppm | |
| Li | ICP emission spectroscopy | 0.01 mass ppm | |
| Mg | | 0.02 mass ppm | |
| Na | Atomic absorption spectrometry | 0.05 mass ppm | |
| Ni | ICP emission spectroscopy | 0.1 mass ppm | |

TABLE 1-continued

| Element | Test method | Detection limit | Result of analysis |
|---|---|---|---|
| S | | 1.0 mass ppm | |
| Si | Absorption spectrophotometry | 0.1 mass ppm | |
| Ti | ICP emission spectroscopy | 0.09 mass ppm | |
| V | | 0.07 mass ppm | |
| Zn | | 0.01 mass ppm | |

As is clearly seen from Table 1 above, it is observed that all the elements are less than the detection limits.

Next, the above-described expanded graphite sheet was packed with a packing material, Shuperen 35N type [made by Ube Film Co., Ltd. The amounts of the elements therein are shown in Table 2. The purity analysis was conducted by taking samples of impurities by acid pickling the surface (sampling area 1250 cm$^2$)]. After setting it aside for 24 hours at normal temperature and normal pressure, the expanded graphite sheet was taken out of the packing material. The ash content of the expanded graphite sheet at the use stage was determined. The results are shown in Table 3.

TABLE 2

| Element | Test method | Detection limit | Allowable limit | Result of analysis |
|---|---|---|---|---|
| Al | ICP-MS | $2 \times 10^{-9}$ mol/m$^2$ | $2 \times 10^{-7}$ mol/m$^2$ | $2 \times 10^{-9}$ mol/m$^2$ |
| B | | $4 \times 10^{-9}$ mol/m$^2$ | — | Less than detection limit |
| Ba | | $1 \times 10^{-9}$ mol/m$^2$ | | |
| Ca | | $1 \times 10^{-9}$ mol/m$^2$ | | |
| Cu | | $5 \times 10^{-9}$ mol/m$^2$ | | |
| Fe | | $5 \times 10^{-9}$ mol/m$^2$ | $3 \times 10^{-7}$ mol/m$^2$ | $30 \times 10^{-9}$ mol/m$^2$ |
| Cr | | $1 \times 10^{-9}$ mol/m$^2$ | $2 \times 10^{-7}$ mol/m$^2$ | $1 \times 10^{-9}$ mol/m$^2$ |
| Li | | $7 \times 10^{-9}$ mol/m$^2$ | — | Less than detection limit |
| Mg | | $2 \times 10^{-9}$ mol/m$^2$ | $2 \times 10^{-7}$ mol/m$^2$ | $2 \times 10^{-9}$ mol/m$^2$ |
| Na | | $10 \times 10^{-9}$ mol/m$^2$ | $5 \times 10^{-7}$ mol/m$^2$ | $40 \times 10^{-9}$ mol/m$^2$ |
| Ni | | $1 \times 10^{-9}$ mol/m$^2$ | — | Less than detection limit |
| Mn | | $1 \times 10^{-9}$ mol/m$^2$ | | |
| Mo | | $1 \times 10^{-9}$ mol/m$^2$ | | |
| Ti | | $4 \times 10^{-9}$ mol/m$^2$ | | |
| V | | $1 \times 10^{-9}$ mol/m$^2$ | $2 \times 10^{-7}$ mol/m$^2$ | $1 \times 10^{-9}$ mol/m$^2$ |
| Zn | | $7 \times 10^{-9}$ mol/m$^2$ | $2 \times 10^{-7}$ mol/m$^2$ | $10 \times 10^{-9}$ mol/m$^2$ |
| Pb | | $1 \times 10^{-9}$ mol/m$^2$ | — | Less than detection limit |

It is observed that in the above-described packing material, the values of B, Ba, Ca, Cu, Li, Ni, Mn, Mo, Ti, and Pb are less than detection limits. It is also observed that the values of Al, Fe, Cr, Mg, Na, V, and Zn are less than allowable limits.

TABLE 3

| Element | Test method | Detection limit | Result of analysis |
|---|---|---|---|
| Al | ICP emission spectroscopy | 0.08 mass ppm | Less than detection limit |
| B | | 0.1 mass ppm | |
| Be | | 0.02 mass ppm | |
| Ca | | 0.04 mass ppm | |
| Cu | | 0.08 mass ppm | |
| Fe | | 0.04 mass ppm | |
| K | Atomic absorption spectrometry | 0.1 mass ppm | |
| Li | ICP emission spectroscopy | 0.01 mass ppm | |
| Mg | | 0.02 mass ppm | |
| Na | Atomic absorption spectrometry | 0.05 mass ppm | |
| Ni | ICP emission spectroscopy | 0.1 mass ppm | |
| S | | 1.0 mass ppm | |
| Si | Absorption spectrophotometry | 0.1 mass ppm | |
| Ti | ICP emission spectroscopy | 0.09 mass ppm | |
| V | | 0.07 mass ppm | |
| Zn | | 0.01 mass ppm | |

As is clearly seen from Table 3 above, it is observed that all the elements are less than the detection limits.

INDUSTRIAL APPLICABILITY

The present invention may be applicable to spacers and heat insulating materials for single crystal pulling apparatuses, and spacers and heat insulating materials for high-pressure impregnating apparatuses.

DESCRIPTION OF REFERENCE NUMERALS

1—spacer
2—heat insulating material
11-13—heat insulating material
14—spacer

The invention claimed is:
1. An expanded graphite sheet characterized in that impurities of the expanded graphite sheet include Al, B, Be, Ca, Cu, Fe, K, Li, Mg, Na, Ni, S, Si, Ti, V, and Zn;
the amounts of the Al, the B, the Be, the Ca, the Cu, the Fe, the Li, the Mg, the Ni, the S, the Ti, the V, and the Zn are determined by an ICP emission spectroscopy method; the amounts of the K and the Na are determined by an atomic absorption spectrometry method; the amount of the Si is determined by an absorption spectrophotometry method;
the amount of the Al is less than 0.08 mass ppm; the amount of the B is less than 0.1 mass ppm; the amount of the Be is less than 0.02 mass ppm; the amount of the Ca is less than 0.04 mass ppm; the amount of the Cu is less than 0.08 mass ppm; the amount of the Fe is less than 0.04 mass ppm; the amount of the K is less than 0.1 mass ppm; the amount of the Li is less than 0.01 mass ppm; the amount of the Mg is less than 0.02 mass ppm; the amount of the Na is less than 0.05 mass ppm; the amount of the Ni is less than 0.1 mass ppm; the amount of the S is less than 1.0 mass ppm; the amount of the Si is less than 0.1 mass ppm; the amount of the Ti is less than 0.09 mass ppm; the amount of the V is less than 0.07 mass ppm; and the amount of the Zn is less than 0.1 mass ppm.

* * * * *